United States Patent
Alatorre et al.

(10) Patent No.: US 10,033,570 B2
(45) Date of Patent: Jul. 24, 2018

(54) DISTRIBUTED MAP REDUCE NETWORK

(71) Applicant: International Business Machines Corporation, Armonk, NY (US)

(72) Inventors: Gabriel Alatorre, Long Beach, CA (US); Divyesh Jadav, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 199 days.

(21) Appl. No.: 14/597,694

(22) Filed: Jan. 15, 2015

(65) Prior Publication Data

US 2016/0212007 A1     Jul. 21, 2016

(51) Int. Cl.
G06F 15/16 (2006.01)
H04L 12/24 (2006.01)
G06F 9/50 (2006.01)

(52) U.S. Cl.
CPC .......... H04L 41/04 (2013.01); G06F 9/5066 (2013.01)

(58) Field of Classification Search
CPC ............................ H04L 41/04; G06F 9/5066
USPC .................................................. 709/223, 226
See application file for complete search history.

(56) References Cited

U.S. PATENT DOCUMENTS

| | | |
|---|---|---|
| 2013/0191843 A1 | 7/2013 | Sarkar et al. |
| 2013/0282788 A1 | 10/2013 | Hylick et al. |
| 2013/0290972 A1 | 10/2013 | Cherkosova et al. |
| 2013/0290976 A1 | 10/2013 | Cherkasova et al. |
| 2014/0359624 A1 | 12/2014 | Cherkasova et al. |
| 2015/0058354 A1* | 2/2015 | Paulk ................ G06F 17/30336 707/743 |
| 2015/0149091 A1* | 5/2015 | Milton .................. H04W 4/028 702/2 |

OTHER PUBLICATIONS

Alrokayan Mohammed et al., "SLA-Aware Provisioning and Secheduling of Cloud Resources for Big Data Analytics", 2014 IEEE International Conference on Cloud Computing in Emerging Markets (CCEM), Oct. 15, 2014, pp. 1-8.*

(Continued)

*Primary Examiner* — Ario Etienne
*Assistant Examiner* — Sahera Halim
(74) *Attorney, Agent, or Firm* — Cantor Colburn LLP; Bryan W Butler (57) ABSTRACT

Embodiments relate to a distributed map reduce network. An aspect includes receiving a description of a map reduce job comprising a time deadline. Another aspect includes selecting a set of candidate nodes from a plurality of nodes of the distributed map reduce network, wherein the set of candidate nodes are selected based on cost value. Another aspect includes determining an amount of time required to perform the map reduce job by the set of candidate nodes. Another aspect includes, based on the determined amount of time not meeting the time deadline: selecting a particular node of the set of candidate nodes for replacement based on the geographical location of the particular node; selecting a next node of the plurality of nodes based on the cost value of the next node; and replacing the particular node in the set of candidate nodes with the next node.

16 Claims, 7 Drawing Sheets

(56) References Cited

OTHER PUBLICATIONS

Costa, F., et al., "Volunteer Cloud Computing: MapReduce Over the Internet," 2011 IEEE International Parallel & Processing Symposium; pp. 1850-1857.
Deyhim, P. "Amazon Web Services: Best Practices for Amazon EMR," Aug. 2013; pp. 1-38.
IP.COM—"Using Flexible Slots and Cross-Assignment to Increase MapReduce Resource Utilization," An IP.com Prior Art Database Technical Disclosure, Authors et al: Disclosed Anonymously; Jan. 10, 2014 pp. 1-8.
IP.com, "System and Method for Hadoop Application Monitoring," An IP.com Prior Art Database Technical Database Authors Disclosed Anonymously; Sep. 18, 2013; pp. 1-4.
Lee, K., et al., "MapReduce on Opportunistic Resources Leveraging Resource Availability," CloudCom, 2012—acis.ufl.edu; pp. 1-8.
Lee, K-H., et al., "Parallel Data Processing with MapReduce: A Survey," SIGMOD Record, Dec. 2011 (vol. 40, No. 4); pp. 11-20.
Lin, H., et al., "MOON: MapReduce on Opportunistic eNvironments," Proceedings of the 19th ACM International Symposium on High Performance Distributed Computing 2010; pp. 1-15.
Polo, J., et al., "Deadline-Based MapReduce Workload Management," IEEE Transactions on Network and Service Management, vol. 10, No. 2, Jun. 2013; pp. 231-244.
Sarikaya, A., "Map-Reduce for Repy," University of Washington, Seattle, WA 98195 USA; Mar. 16, 2009; pp. 1-7.
Tang, Z., et al., "MTSD: A Task Scheduling Algorithm for MapReduce Base on Deadline Constraints," 2012 IEEE 26th International Parallel and Distributed Processing Symposium Workshops & PhD Forum; pp. 2012-2018.
Alrokayan et al., "SLA-aware Provisioning and Scheduling of Cloud Resources for Big Data Analytics", 2014 IEEE Intl Conference on Cloud Computing in Emerging Markets (CCEM), Oct. 15, 2014; 8 pgs.
Hwang et al., Minimizing Cost of Virtual Machines Cor Deadline-Constrainted MapReduce Applications in the Cloud; 2012 ACM, IEEE 13th International Conference on Grid Computing; Sep. 20, 2013; 9 pgs.
International Search Report and Written Opinion for International Application No. PCT/EP2016/050089 filed Jan. 5, 2016; dated Apr. 4, 2016; 12 pgs.

* cited by examiner

402  | NODE 401A | NODE 401B | NODE 401C | NODE 401D | NODE 401E | NODE 401F | NODE 401G |  T = 6

403  | NODE 401A | NODE 401B | NODE 401C | NODE 401D | NODE 401E | NODE 401F | NODE 401G |  T = 5.3

404  | NODE 401A | NODE 401B | NODE 401C | NODE 401D | NODE 401E | NODE 401F | NODE 401G |  T = 5.8

405  | NODE 401A | NODE 401B | NODE 401C | NODE 401D | NODE 401E | NODE 401F | NODE 401G |  T = 5.2

406  | NODE 401A | NODE 401B | NODE 401C | NODE 401D | NODE 401E | NODE 401F | NODE 401G |  T = 4.7

DISTRIBUTED MAP REDUCE NETWORK

BACKGROUND

The present invention relates generally to distributed networks, and more specifically, to management of a map reduce service on a distributed network.

Large data processing jobs require the availability of commensurately large computational, networking, and storage resources. An example of a data processing technique that is applied to relatively large data sets is the map reduce paradigm. Map reduce is a programming model for processing large data sets using a parallel algorithm on a cluster of computers. Map reduce allows scalability over hundreds or thousands of nodes that process data in parallel. Numerous nodes comprising relatively inexpensive, lower-capability resources, as opposed to nodes comprising a few expensive and specialized resources, may be used for parallel processing of such large data processing jobs. The parallel execution can be in lockstep or in a loosely parallel manner. The nodes can be in close proximity (e.g., on the same network and in the same building) and use near-identical hardware, in which case the nodes may be referred to as a cluster; or, the nodes can be geographically distributed and use more heterogenous hardware, in which case the nodes constitute a grid.

The map reduce framework includes two distinct phases: the map function and the reduce function. The map function takes input data organized as (key, value) pairs. For a data pair with a type in one domain, the map function transforms the data pair into a list of pairs in another domain. The map function is applied in parallel to every data pair in the input dataset, producing a list of pairs for each call. After the map function is complete, the overall framework collects all pairs with the same key from all lists, and groups them together, creating one group for each key. The reduce function is then applied in parallel to each group, which produces a collection of values in the same domain. The reduce function results are collected as the desired result list. Thus the map reduce framework transforms a list of (key, value) pairs into a list of values. One example of a typical map reduce job is to take an input data set comprising series of sensor data giving the maximum daily temperature over a month in a set of cities. In order to find the maximum temperature for each city across all of the data files for the month, map reduce is applied as follows: assign as many map tasks as the number of files, and each map task finds the maximum temperature for each city listed in its input file over the one month. Then, the reduce step gathers all data for each city (i.e., the cities are the keys for the reduce function) from the map task outputs into a group, and determines the maximum temperature for each city over the month from the data group for that city. The output after completion of the reduce step is a list of cities, and the maximum temperature for each city over the one month.

Data processing may be performed on any sort of computing or entertainment devices, such as desktop computers, game consoles, tablet computers, smart phones, set-top boxes, and internet protocol (IP) streaming devices. A typical household might have any number each of any combination of such devices. The devices may vary widely in terms of compute, memory, storage and networking capabilities and may have relatively low utilization (i.e., be idle most of the time). Further, such devices are capable of internet connectivity, and are not turned off when not in use, so that the devices are connected to the network most of the time.

SUMMARY

Embodiments include a method, system, and computer program product for a distributed map reduce network. An aspect includes receiving a description of a map reduce job comprising a time deadline. Another aspect includes determining a set of job nodes for the map reduce job from a plurality of nodes of the distributed map reduce network, wherein each of the plurality of nodes has an associated respective cost value and geographical location. Another aspect includes selecting a set of candidate nodes from the plurality of nodes, wherein the set of candidate nodes are selected based on cost value. Another aspect includes determining an amount of time required to perform the map reduce job by the set of candidate nodes. Another aspect includes comparing the determined amount of time to the time deadline. Another aspect includes, based on the determined amount of time not meeting the time deadline: selecting a particular node of the set of candidate nodes for replacement based on the geographical location of the particular node; selecting a next node of the plurality of nodes based on the cost value of the next node; and replacing the particular node in the set of candidate nodes with the next node.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

Embodiments of a distributed map reduce network are provided, with exemplary embodiments being discussed below in detail. The distributed map reduce network may utilize the relatively large number of available consumer computing and entertainment devices that are connected to the internet as nodes. The distributed map reduce network includes an orchestrator that receives map reduce jobs, and determines a set of nodes in the distributed map reduce network in a manner that optimizes completion of the job for both cost and time. The orchestrator node maintains a respective node profile regarding each of the nodes that are available in the distributed map reduce network in order to determine job assignments. Each node profile may specify a particular price for use of the node's resources, along with the capability and availability of the node.

The distributed map reduce network may process map reduce jobs on any appropriate type of input dataset. The input data set may be, for example, any generally available public data, such as home sales, court records, county records, national air and space administration (NASA) images, and election results. Further input dataset examples include government data such as census data, university data, experimental data, and weather related data such as atmospheric conditions sensor data, rainfall, snowpack and snowfall measurements, water table measurements, and weather forecasting. Further examples include gaming data, such as gaming simulations, gaming strategies, and gaming cheat codes; location-specific data, such as traffic conditions, parking garage occupancy, and retail sales; anonymized data, such as clinical data and epidemiological data; and publicly available feeds such as stock trading data.

Master nodes may be designated in the distributed map reduce network. In some embodiments, master nodes are devices that are owned by the operator of the distributed map reduce network. In some embodiments, nodes in the distributed map reduce network that are determined to be relatively reliable over time may be selected as master nodes. In some embodiments, the master nodes may initially be dedicated geographically-dispersed devices that are owned by the network operator, and, over time, nodes with, for example, high selection scores in their node profile are selected as additional or replacement master nodes.

When a job is assigned to a set of job nodes, a sub-cluster of additional nodes in the distributed map reduce network may be determined for each of the job nodes. The nodes within a sub-cluster have high affinities with one another; for example, the nodes within a sub-cluster may be relatively geographically close together and may offer similar service levels and pricing. The input data for a particular job node may be distributed to other nodes in the particular job node's sub-cluster, such that the other nodes may act as failover nodes in case of failure by the particular node. Nodes within a sub-cluster may be selected so that they are on different electrical and/or network grids, so as to avoid multiple-node failure within a sub-cluster.

Figure 1:
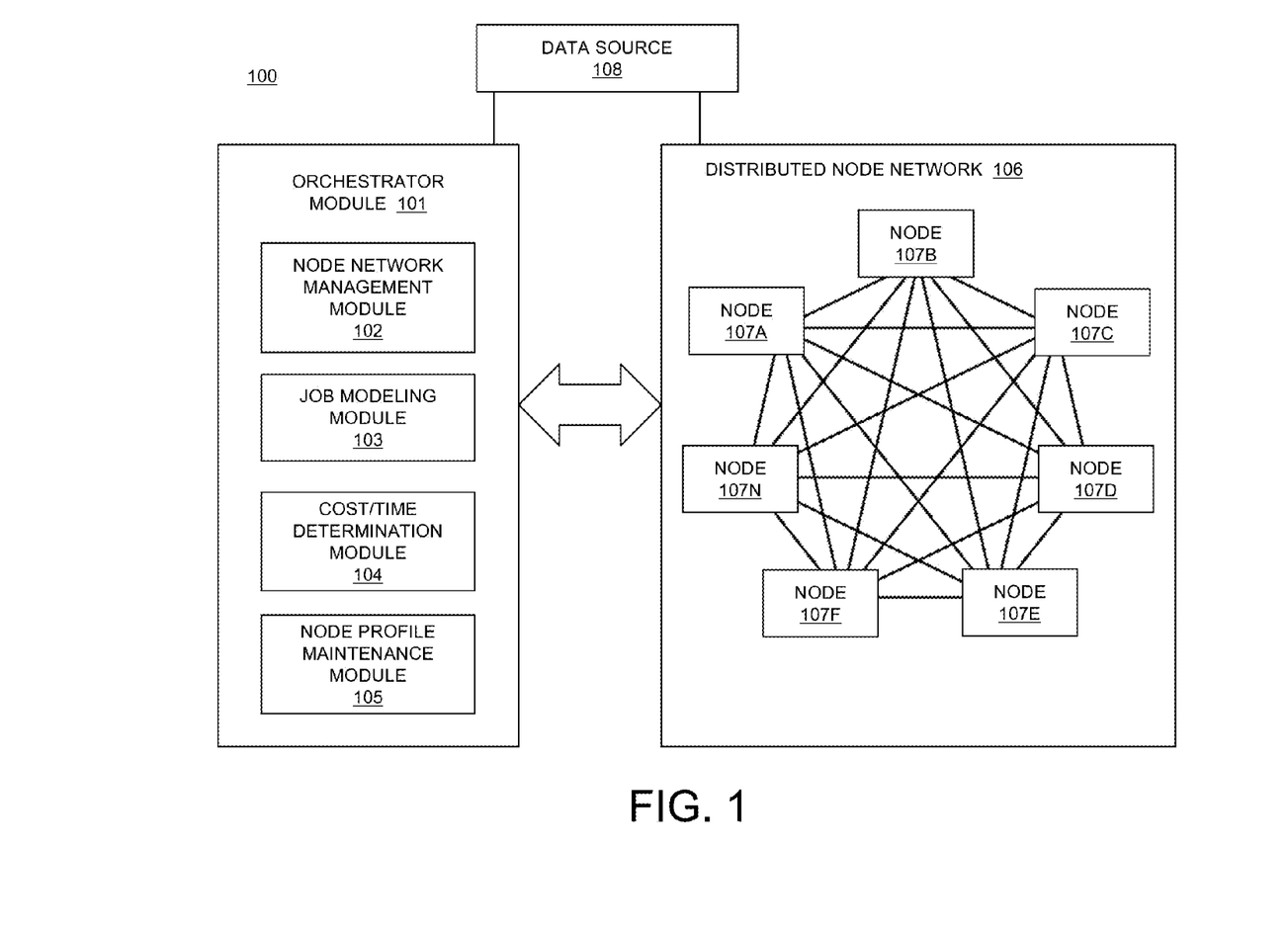
FIG. 1 depicts a distributed map reduce network in accordance with an embodiment.

FIG. 1 illustrates an embodiment of a distributed map reduce network 100. The distributed map reduce network 100 includes an orchestrator module 101 that is in communication with a plurality of nodes 107A-N that make up a distributed node network 106. The orchestrator module 101 receives a map reduce job description, and selects nodes from the distributed node network 106 to perform the map reduce job based on the job description and the characteristics of the nodes 107A-N. The orchestrator module 101 includes a node network management module 102, a job modeling module 103, a cost/time determination module 104, and a node profile maintenance module 105. A map reduce job description specifies a time deadline for completion, desired output data, and a data source such as data source 108, which may be located in any appropriate location with respect to distributed node network 106 and orchestrator module 101. The job description may further include the input data size, and a number of nodes and a node class to use to perform the job. Some of the nodes 107A-N in distributed node network 106 may be devices that are owned by the distributed map reduce network 100, while other nodes of the nodes 107A-N may be owned by other entities that have submitted their nodes for use by the distributed map reduce network 100. Any nodes that are owned by the distributed map reduce network 100 may be used to accept map reduce jobs from clients, act as master nodes for jobs, act as orchestrator nodes, such as orchestrator module 101, for jobs, and may also be used by job modeling module 103 for estimating job resource requirements.

The node network management module 102 keeps track of executing jobs, keeps track of whether nodes thought to be in the network are online or offline, queries provider nodes regarding the cost per unit time for use of provider resources, and indexes the nodes based on various criteria. The job modeling module 103 models the anticipated resources needed to execute an input job. The job modeling module 103 is invoked by the cost/time determination module 104, which implements method 300 of FIG. 3, which is discussed below, to select the nodes from the distributed node network 106 to perform a given job.

The node profile maintenance module 105 maintains a profile for each of the nodes 107A-N in distributed node network 106. Each node profile includes node information such as usage cost per unit time (for CPU and storage usage), node class (based on published and/or observed storage, network, and CPU capabilities), affinity value(s) with other nodes, which may be based on cost, node class, and/or geographic similarity, electric grid profile, which may be generated with publicly available data from the local utility of the node, availability, geographical location, and resource constraints (based on published and/or historical information). Some information (for example, cost) in a node's profile may be provided by an owner of the node, while other information may be determined by the node profile maintenance module 105 based on observation of the node. An overall selection score may also be determined for the node that combines availability and dependability, i.e., how likely is the node to successfully complete a job that is assigned to it without failing or preempting its resources. The selection score may be determined based on history of jobs performed by the node, whether those jobs were completed or abandoned, and further based on the current online time of the node (i.e., time since last node failure).

When the orchestrator module 101 receives a map reduce job, the node network management module 102 may generate a list of all nodes that are candidates for performing the job, sorted by cost. The list is determined based on data in the node profiles maintained by node profile maintenance module 105, including but not limited to availability during estimated job duration, where job duration is estimated using prior history and/or coarse-grained job profiling; membership in a node class that is appropriate for the job, and a selection score that is higher than a selection score threshold. A set of nodes is then selected from the list by cost/time determination module 104 based on minimizing the cost charged to the customer for performing the job while meeting the time constraints for the job. In addition to selecting a set of job nodes when a job is initially received, in some embodiments, after the map function has completed by the set of job nodes, a second set of job nodes may be selected to perform the reduce function. In such an embodiment, the number of nodes in the second set of nodes may be equal to the number of keys in the output of the map function.

FIG. 1 is shown for illustrative purposes only; the nodes in a distributed node network such as distributed node network 106 may be interconnected, and connected to orchestrator module 101 and data source 108, in any appropriate fashion. Further, a distributed node network such as distributed node network 106 may comprise any appropriate number and type of nodes, and the nodes may be in any appropriate physical location. Further, a distributed map reduce network 100 may comprise any appropriate number of orchestrator modules such as orchestrator module 101.

Figure 2:
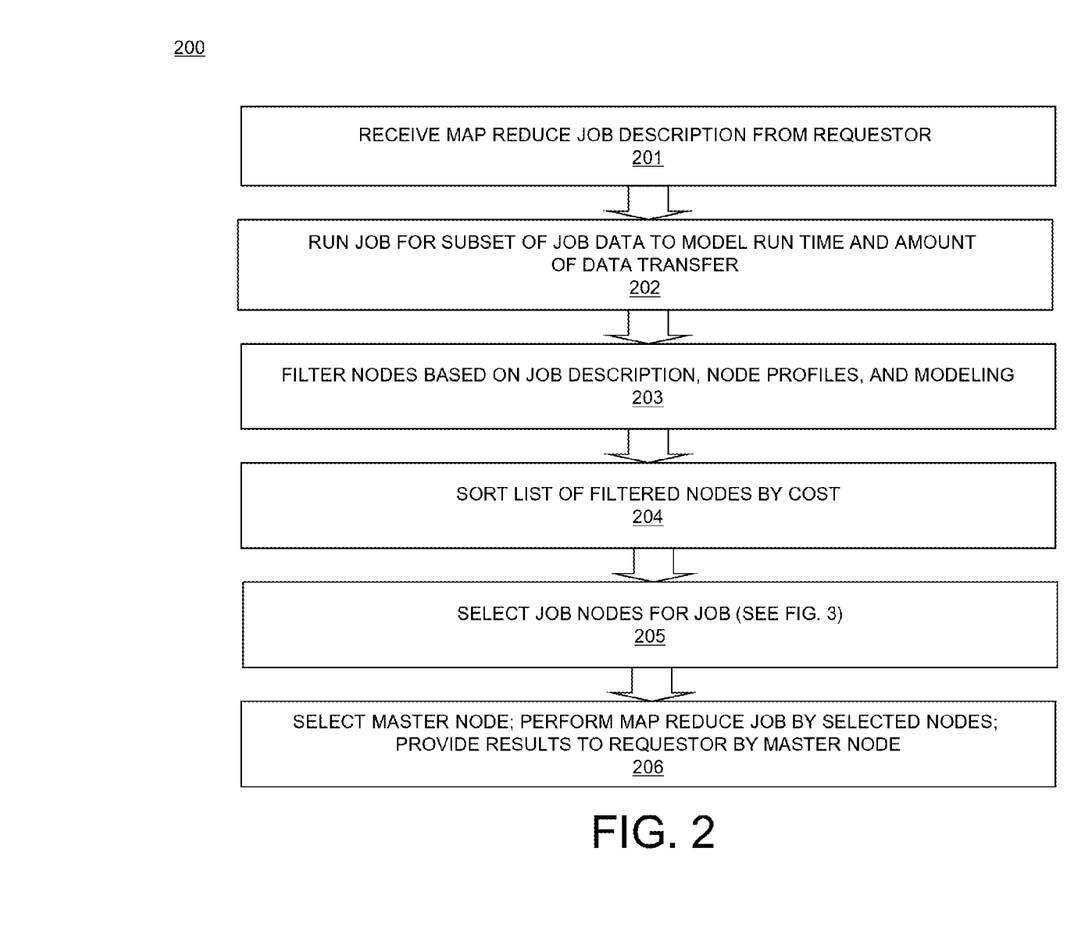
FIG. 2 depicts a method for performing a map reduce job in a distributed map reduce network in accordance with an embodiment.

FIG. 2 illustrates an embodiment of a method 200 for performing a map reduce job in a distributed map reduce network. FIG. 2 is discussed with respect to FIG. 1. First, in block 201, a map reduce job description is received by the orchestrator module 101 from a requestor. The job description includes the following information: data size, data location (for example, data source 108), desired number of nodes (K), desired node service class, and deadline for completion. Then, in block 202, the job modeling module 103 runs the job on a subset of the job data from data source 108 in order to model the run time and amount of data transfer that will be required to complete the job. Next, in block 203, initial filtering of the available nodes in the distributed node network 106 is performed based on the job description is performed by orchestrator module 101 based on the information in the node profiles that are maintained by node profile maintenance module 105. The initial filtering may return a list of nodes in the distributed node network 106 that are in the desired node service class that is specified in the job description. The initial filtering of block 203 may also exclude nodes with selection scores below a threshold, nodes in power outage areas, or nodes that are not available for the estimated duration of the job as determined based on the modeling of block 202. Then, in block 204, the filtered node list that was generated in block 203 is sorted based on cost, for example, from cheapest to most expensive. The cost for each node is specified in the node's profile. In block 205, K nodes, as specified by the job description, which can perform the job by the deadline at a lowest cost are selected from the sorted list. Block 205 is discussed in further detail with respect to FIG. 3.

Lastly, in block 206, the job is performed by the K selected nodes, and the job results are provided to the requestor. A master node is chosen for the job in block 206 before performing the job. The master node may be chosen from the job nodes in some embodiments. In some embodiments, the distributed map reduce network owns geographically distributed, trusted nodes for each node class, and the master node is chosen from these network-owned nodes. In some embodiments, a relatively reliable provider node (identified by, for example, a relatively high selection score) that is not owned by the network can be chosen as a master node. Performing the job includes distribution of chunks of the input data to each of the job nodes, map processing, which is performed by each of the selected job nodes on their respective chunk of the input data, followed by data transfer of the mapped data between the nodes based on the keys that are output by the map function, and then reduce processing on a respective chunk of the mapped data by each of the selected nodes. The distribution of the raw input data and the mapped data among the nodes may be overseen by the master node. In some embodiments of block 206, the same set of job nodes that performed the map processing are also used for the reduce processing. In some embodiments, another set of M cheapest nodes, where M is the number of keys and key lists that were output by the map processing, are determined using the method 300 of FIG. 3 after the map processing is completed, and these M cheapest nodes are used to perform the reduce processing in block 206. After reduce processing is completed, the master node has the results of processing the job, which are returned to the job requestor who submitted the job description.

Figure 3:
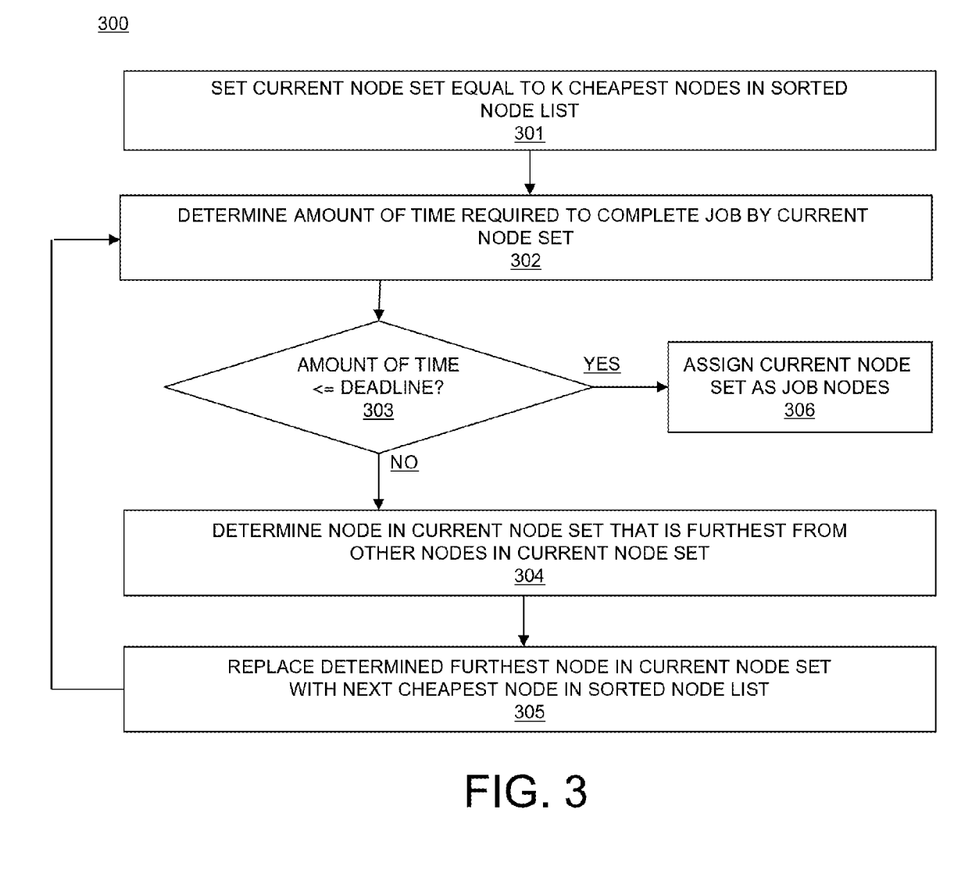
FIG. 3 depicts a method for job node selection in a distributed map reduce network in accordance with an embodiment.

FIG. 3 illustrates an embodiment of node selection as is performed in block 205 of FIG. 2. First, in block 301, a current node set is set equal to the K cheapest nodes in the sorted node list that was generated in block 204, K being the number of nodes specified in the job description. Next, in block 302, an amount of time required to complete the job by the current node set is determined. This determination is made based on the modeled run time and amount of data transfer that were generated in block 202, and also based on the node profiles of each of the nodes in the current node set. Then, in block 303, the amount of time that was determined in block 302 is compared to the deadline that was specified in the job description. If it is determined in block 303 that the amount of time is greater than the deadline, i.e., that the job will not be completed by the deadline, flow proceeds from block 303 to block 304. In block 304, for each of the K nodes, the average geographical distance from the other K nodes is determined, and a node of the K nodes that is furthest from the other nodes is then determined. Then, in block 305, the furthest node that was determined in block 304 is replaced in the current node set by the next cheapest node in the sorted list, and flow returns to block 302. Blocks 302-305 are repeated until, in block 303, the amount of time that was determined in block 302 is determined to be less than or equal to the deadline, i.e., the current node set can complete the job by the deadline, at which point flow proceeds in block 306. In block 306, the current node set is assigned to the job, and method 300 ends.

Figure 4:
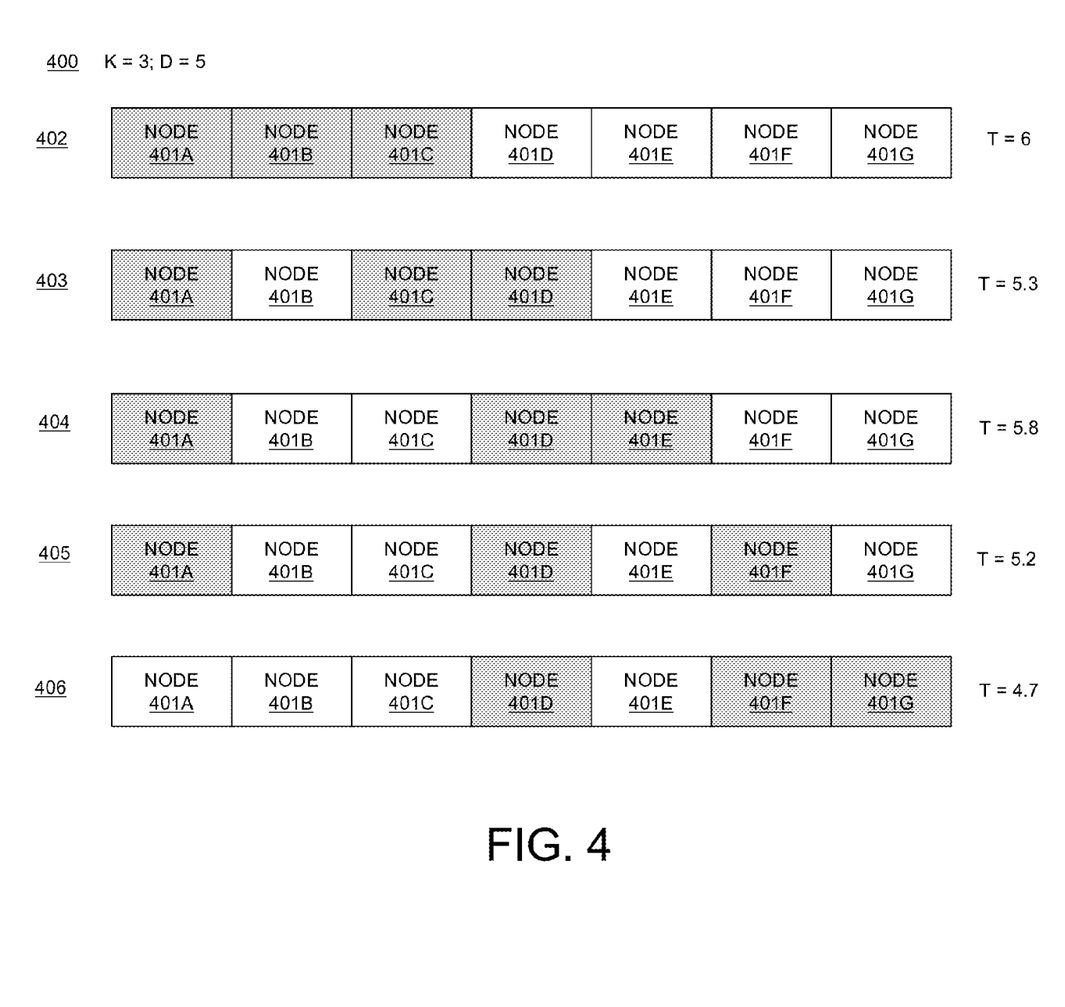
FIG. 4 depicts an example of job node selection in a distributed map reduce network in accordance with an embodiment.

FIG. 4 illustrates an example 400 of execution of method 300 of FIG. 3. In the example 400 of FIG. 4, the number K of nodes that is specified in the job description is 3, and the deadline is 5 hours. Nodes 401A-G are a subset of nodes in a distributed network such as distributed node network 106. Each of nodes 401A-G is in a service class that matches the job description. Further, nodes 401A-G are sorted in order from the cheapest node 401A to the most expensive node 401G. In the first iteration of method 300, nodes 401A-C are selected as the current node set in block 301, and the amount of time determined in block 302 is 6. Because 6 is greater than the deadline of 5, flow proceeds from block 303 to block 304, in which it is determined that node 401B is the furthest from the other nodes. So, in the next iteration 403 of method 300, node 401B is replaced by node 401D. In iteration 403, the amount of time that is determined is 5.3 and the furthest node is determined to be node 401C. In iteration 404, node 401C is replaced by node 401E, the amount of time that is determined is 5.8, and the furthest node is determined to be node 401E. In iteration 405, node 401E is replaced by node 401F, the amount of time is determined is 5.2, and node 401A is determined to the furthest node. In iteration 406, node 401A is replaced by node 401G, and the amount of time that is determined is 4.7, which is less than the deadline of 5, so the job is assigned to nodes 401D, 401F, and 401G.

Figure 5:
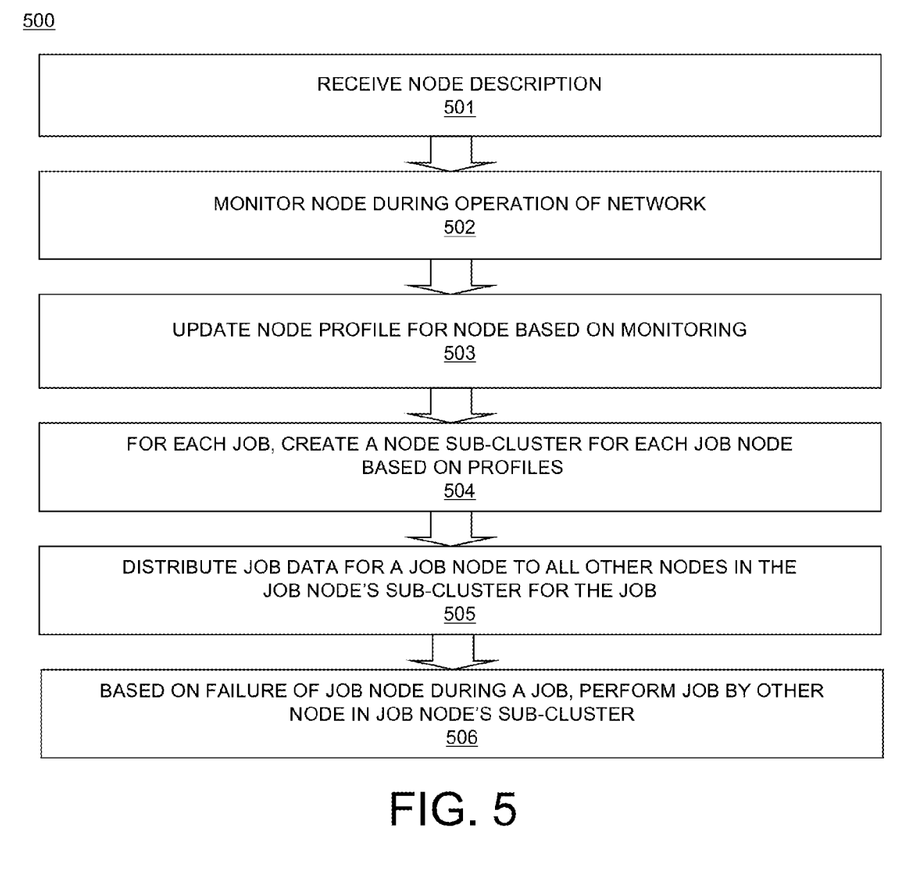
FIG. 5 depicts a method for node management in a distributed map reduce network in accordance with an embodiment.

FIG. 5 illustrates an embodiment of a method 500 for managing a distributed map reduce network. Method 500 may be implemented in orchestrator module 101 of FIG. 1. In block 501, the orchestrator module 101 receives a node description from a node that wishes to be part of the distributed node network 106. The node description contains geographical location information, a cost per unit of time for using the node, and may further include information regarding capability (i.e., CPU, storage and network resources) and availability of the node. The node profile maintenance module 105 may set up a profile for the node including further information such as node class (determined based on the CPU, storage, and network resources of the node);

affinity values with any nearby nodes based on cost and geographic location similarity, electricity grid profile (e.g. outage blocks, grid network), and a selection score reflecting overall availability and dependability of the node. In block 502, the node profile maintenance module 105 monitors the performance of the node during operation of the distributed node network 106. In block 503, the node profile for the node is updated based on the monitoring. For example, availability information in the node profile may be updated based on observed availability and online time of the node. Next, in block 504, for a job for which a set of nodes has been selected, as performed in block 205 of FIG. 2, a respective node sub-cluster is determined for each of the selected nodes based on the node profiles maintained by node profile maintenance module 105. These sub-clusters are used for failover during the performance of the job. The node sub-clusters are determined based on selecting groups of nodes that have high affinity values with one another. These affinity values will be relatively high for nodes that are in the same node class, and that are similar in terms of cost, availability, and location. Further, the sub-clusters may be assigned such that nodes in the same sub-cluster are on different electrical and network grids, such that an outage that affects one node in the sub-cluster will not affect another node in the same sub-cluster. In block 505, the subset of the job data that is assigned to a particular job node is also distributed to the nodes in the particular job node's sub-cluster. In block 506, when a job node fails during a job, one of the other nodes in the job node's sub-cluster, which already has the failed node's job data, takes over for the job node. The various blocks of method 500 are repeated as needed during the operation of the distributed node network 106.

Figure 6:
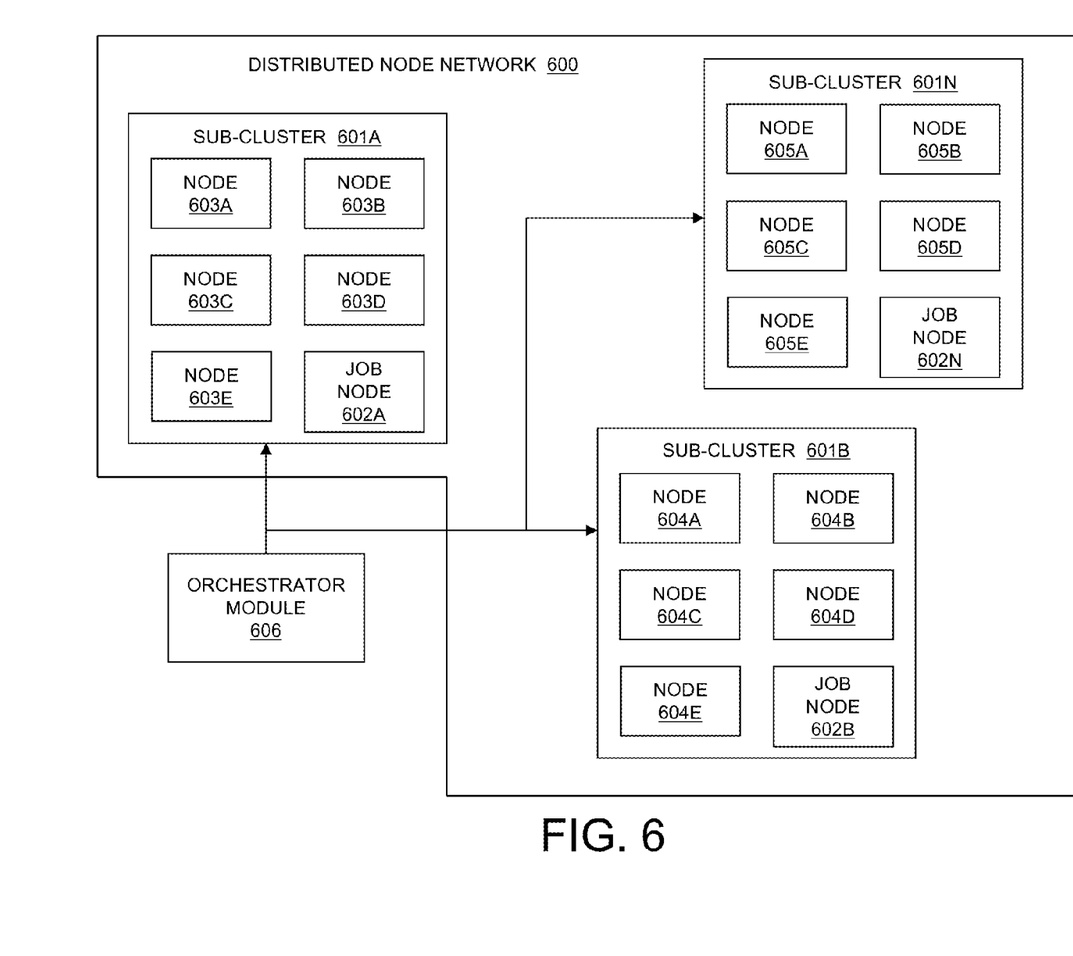
FIG. 6 depicts an example of sub-clusters in a distributed map reduce network in accordance with an embodiment.

FIG. 6 illustrates an embodiment of a distributed node network 600 with sub-clusters 601A-N. Job nodes 602A-N are job nodes that are assigned to a particular job; job nodes 602A-N were selected from a plurality of nodes in the distributed map reduce network 100 as described above with respect to FIGS. 2 and 3. For each of job nodes 602A-N, a respective sub-cluster 601A-N is selected in block 504 of FIG. 5. Nodes 603A-E each have a relatively high affinity value with job node 602A; nodes 604A-E each have a relatively high affinity value with job node 602B, and nodes 605A-E each have a relatively high affinity value with job node 602N. Within each of sub-clusters 601A-N, the nodes may be on different electrical or network grids, so as to reduce the probability that an electrical or network failure will affect multiple nodes within a sub-cluster. The sub-clusters 601A-N are assigned after the set of job nodes 602A-N is selected for a job, but before the map processing is begun. Before the start of map processing, the input data that is assigned to each job node of job nodes 602A-N is replicated to all other nodes in the node's respective sub-cluster in block 505 of FIG. 5. Therefore, if the job node fails, a new job node is chosen from the sub-cluster of the failed job node, and the local job is restarted in block 506 of FIG. 5. For example, the respective chunk of the job input data that is assigned to job node 602A is also distributed to each of nodes 603A-E by orchestrator module 101/606.

Once the map processing is complete, the mapped data is shuffled between the job nodes 602A-N, and the reduce processing is performed on the mapped data. In some embodiments, the same set of job nodes 602A-N that performed the map processing are used for the reduce processing. In some embodiments, another set of M cheapest nodes, where M is the number of keys that were output by the map processing, are determined using the method 300 of FIG. 3 after the map processing is completed, and these M cheapest nodes are used to perform the reduce processing. After reduce processing is completed, the master node has the results of processing the job, which are returned to the job requestor who submitted the job description.

Table 1 illustrates an example of pseudocode illustrating method 300 of FIG. 3.

TABLE 1

Pseudocode Example of Determining Job Node Set

```
# n is the number of nodes, d is the deadline
solution set = main(n,d)
main(n,d):
    if n <= 0:
        return "no solution"
    if set s (of closest n nodes to data) is estimated to complete job
within
    deadline:
        # now know a set exists that can meet the deadline,
        so find cheapest set
        c = cost(s)
        # n is the number of nodes, d is the deadline, c is the cost thresh-
old
        s = findCheapestSet(n,d,c)
        return s
    else
        return "no solution"
findCheapestSet(n,d,c):
    set s = select cheapest n nodes (within sorted list)
    while s does not finish within deadline:
        # replace node "furthest" from the other nodes with next
        cheapest node
        s = replaceFurthestNode(s)
    return s
replaceFurthestNode(s):
    s.add(dataLocationNode)
    furthest = null
    max = -1
    for node a in s:
        # node a is node under evaluation
        if(a == dataLocationNode)
            # data location node is not a candidate for removal so skip
            continue;
        time = 0
        for node b in s:
            # get avg "distance" of node a to all others
            if(a == b) # no need to compare node a to itself so skip
                continue;
            time = time + ping(a,b)
        # size reduced by one to disregard node a itself
        avg = time/(size(s)-1)
        if avg > max:
            furthest = a
            max = avg
    # found furthest node at this point
    s.remove(furthest)
    s.remove(dataLocationNode)
    # add next cheapest node and return set
    next = getNextCheapestNode( )
    s.add(next)
    return s
```

Figure 7:
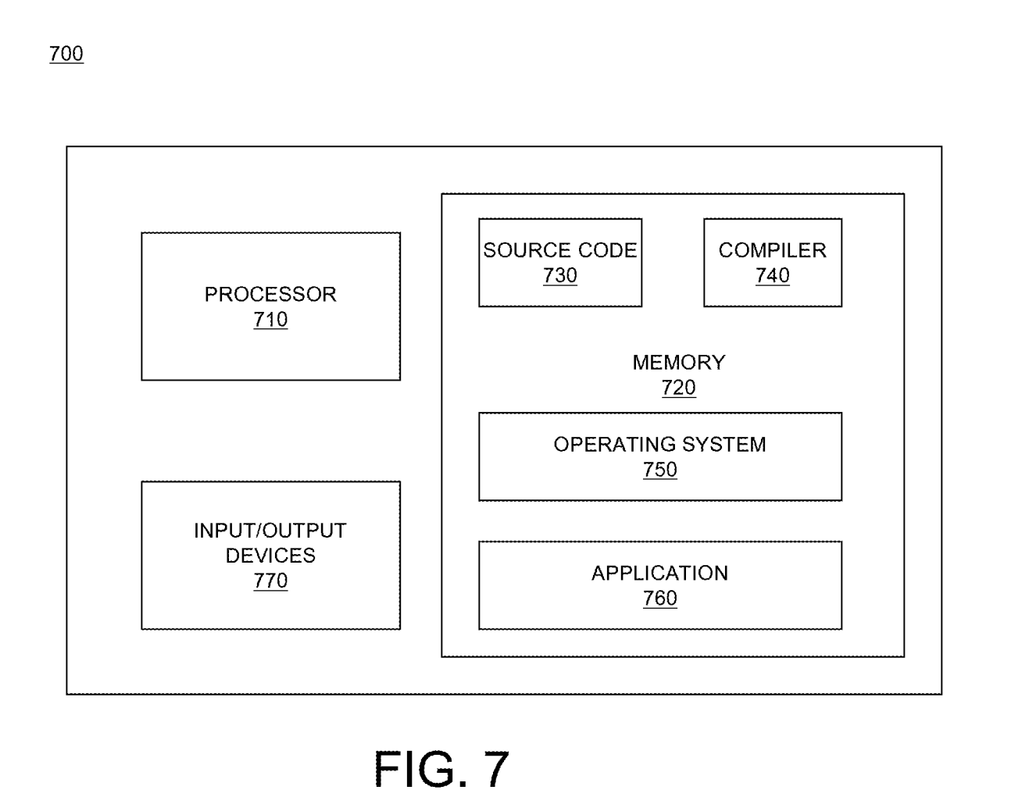
FIG. 7 depicts an example of a computer system that may be used in conjunction with a distributed map reduce network according to an embodiment.

FIG. 7 illustrates an example of a computer 700 which may be utilized by exemplary embodiments of distributed map reduce network. Various operations discussed above may utilize the capabilities of the computer 700. One or more of the capabilities of the computer 700 may be incorporated in any element, module, application, and/or component discussed herein. For example, embodiments of a computer 700 may comprise any of the orchestrator module, data source, or nodes in the distributed node network as discussed above.

The computer 700 includes, but is not limited to, PCs, workstations, laptops, PDAs, palm devices, servers, storages, and the like. Generally, in terms of hardware architecture, the computer 700 may include one or more processors 710, memory 720, and one or more I/O devices 770 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 710 is a hardware device for executing software that can be stored in the memory 720. The processor 710 can be virtually any custom made or commercially available processor, a central processing unit (CPU), a digital signal processor (DSP), or an auxiliary processor among several processors associated with the computer 700, and the processor 710 may be a semiconductor based microprocessor (in the form of a microchip) or a macroprocessor.

The memory 720 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 720 may incorporate electronic, magnetic, optical, and/or other types of storage media. Note that the memory 720 can have a distributed architecture, where various components are situated remote from one another, but can be accessed by the processor 710.

The software in the memory 720 may include one or more separate programs, each of which comprises an ordered listing of executable instructions for implementing logical functions. The software in the memory 720 includes a suitable operating system (O/S) 750, compiler 740, source code 730, and one or more applications 760 in accordance with exemplary embodiments. As illustrated, the application 760 comprises numerous functional components for implementing the features and operations of the exemplary embodiments. The application 760 of the computer 700 may represent various applications, computational units, logic, functional units, processes, operations, virtual entities, and/or modules in accordance with exemplary embodiments, but the application 760 is not meant to be a limitation.

The operating system 750 controls the execution of other computer programs, and provides scheduling, input-output control, file and data management, memory management, and communication control and related services. It is contemplated by the inventors that the application 760 for implementing exemplary embodiments may be applicable on all commercially available operating systems.

Application 760 may be a source program, executable program (object code), script, or any other entity comprising a set of instructions to be performed. When a source program, then the program is usually translated via a compiler (such as the compiler 740), assembler, interpreter, or the like, which may or may not be included within the memory 720, so as to operate properly in connection with the O/S 750. Furthermore, the application 760 can be written as an object oriented programming language, which has classes of data and methods, or a procedure programming language, which has routines, subroutines, and/or functions, for example but not limited to, C, C++, C#, Pascal, BASIC, API calls, HTML, XHTML, XML, ASP scripts, FORTRAN, COBOL, Perl, Java, ADA, .NET, and the like.

The I/O devices 770 may include input devices such as, for example but not limited to, a mouse, keyboard, scanner, microphone, camera, etc. Furthermore, the I/O devices 770 may also include output devices, for example but not limited to a printer, display, etc. Finally, the I/O devices 770 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 770 also include components for communicating over various networks, such as the Internet or intranet.

If the computer 700 is a PC, workstation, intelligent device or the like, the software in the memory 720 may further include a basic input output system (BIOS) (omitted for simplicity). The BIOS is a set of essential software routines that initialize and test hardware at startup, start the O/S 750, and support the transfer of data among the hardware devices. The BIOS is stored in some type of read-only-memory, such as ROM, PROM, EPROM, EEPROM or the like, so that the BIOS can be executed when the computer 700 is activated.

When the computer 700 is in operation, the processor 710 is configured to execute software stored within the memory 720, to communicate data to and from the memory 720, and to generally control operations of the computer 700 pursuant to the software. The application 760 and the O/S 750 are read, in whole or in part, by the processor 710, perhaps buffered within the processor 710, and then executed.

When the application 760 is implemented in software it should be noted that the application 760 can be stored on virtually any computer readable storage medium for use by or in connection with any computer related system or method. In the context of this document, a computer readable storage medium may be an electronic, magnetic, optical, or other physical device or means that can contain or store a computer program for use by or in connection with a computer related system or method.

The application 760 can be embodied in any computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable storage medium" can be any means that can store the program for use by or in connection with the instruction execution system, apparatus, or device. The computer readable storage medium can be, for example but not limited to, an electronic, magnetic, optical, electromagnetic, or semiconductor system, apparatus, or a device.

More specific examples (a nonexhaustive list) of the computer-readable storage medium may include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable storage medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In exemplary embodiments, where the application 760 is implemented in hardware, the application 760 can be implemented with any one or a combination of the following technologies, which are well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Technical effects and benefits include completion of map reduce jobs in a distributed map reduce network based on both time and cost constraints.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A nonexhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method for a distributed map reduce network, the method comprising:
    receiving a description of a map reduce job comprising a time deadline;
    assigning a set of job nodes to the map reduce job from a plurality of nodes of the distributed map reduce network, wherein each of the plurality of nodes has an associated respective cost value and geographical location, and wherein assigning the set of job nodes comprises:
        selecting a set of candidate nodes from the plurality of nodes, wherein the set of candidate nodes are selected based on cost value;
        determining an amount of time required to perform the map reduce job by the set of candidate nodes;
        comparing the determined amount of time to the time deadline; and
        based on the determined amount of time not meeting the time deadline:
            selecting a particular node of the set of candidate nodes for replacement based on the geographical location of the particular node, wherein selecting the particular node of the set of candidate nodes for replacement based on the geographical location of the particular node comprises determining, for each node of the set of candidate nodes, an average geographical distance from each of the other nodes of the set of candidate nodes and selecting a node having a highest average geographical distance in the set of candidate nodes as the particular node;
            selecting a next node of the plurality of nodes based on the cost value of the next node; and
            replacing the particular node in the set of candidate nodes with the next node; and
    after assigning a set of job nodes to the map reduce job, performing the map reduce job by at least disturbing chunks of input data to each node of the assigned set of job nodes, wherein each node of the assigned set of job nodes is configured to:
        perform map processing on a respective chunk of the input data to generate mapped data;
        transfer the mapped data to other nodes of the assigned set of job nodes, wherein the transfer is based on keys that are output by a map function; and
        perform reduce processing on a respective chunk of the mapped data.

2. The method of claim 1, wherein the description of the map reduce job comprises a target number of nodes, and wherein the set of candidate nodes comprises a number of nodes that is equal to the target number of nodes.

3. The method of claim 1, further comprising maintaining a respective node profile for each of the plurality of nodes of the map reduce network, wherein the node profile for each node comprises: the cost value of the node, the cost value comprising a cost per unit time for using the node, an availability of the node, the geographical location of the node, and a service class of the node;
    monitoring the plurality of nodes of the map reduce network during operation of the map reduce network; and
    updating the node profiles based on the monitoring.

4. The method of claim 3, further comprising filtering the plurality of nodes of the map reduce network based on service class and availability to determine a filtered list of nodes that are appropriate for performing the map reduce job; and
    sorting the filtered node list based on cost value from cheapest to most expensive, wherein the set of candidate nodes is selected from the sorted list.

5. The method of claim 4, wherein selecting the set of candidate nodes from the plurality of nodes comprises selecting a set of cheapest nodes from the sorted list; and
    wherein the next node comprises a next cheapest node in the sorted list.

6. The method of claim 1, further comprising:
    determining, for the map reduce job, a respective sub-cluster of nodes for each node of the set of job nodes, wherein at least one node of each sub-cluster acts as a failover node based on a failure of the node of the set of job nodes that is in the sub-cluster; and
    for each node of the set of job nodes, distributing a respective chunk of the input data of the map reduce job to the node of the set of job nodes and to each node in the sub-cluster of the node of the set of job nodes.

7. The method of claim 1, further comprising, after performing of a map function of the map reduce job by the set of job nodes, determining a second set of job nodes to perform a reduce function of the map reduce job, wherein a number of the second set of job nodes is equal to a number of keys output by the map function.

8. A computer program product for implementing a distributed map reduce network, the computer program product comprising:
    a non-transitory computer readable storage medium having program instructions embodied therewith, the program instructions readable by a processing circuit to cause the processing circuit to perform a method comprising:
        receiving a description of a map reduce job comprising a time deadline;
        assigning a set of job nodes to the map reduce job from a plurality of nodes of the distributed map reduce network, wherein each of the plurality of nodes has an associated respective cost value and geographical location, and wherein assigning the set of job nodes comprises:
            selecting a set of candidate nodes from the plurality of nodes, wherein the set of candidate nodes are selected based on cost value;
            determining an amount of time required to perform the map reduce job by the set of candidate nodes;

comparing the determined amount of time to the time deadline; and based on the determined amount of time not meeting the time deadline:

selecting a particular node of the set of candidate nodes for replacement based on the geographical location of the particular node, wherein selecting the particular node of the set of candidate nodes for replacement based on the geographical location of the particular node comprises determining, for each node of the set of candidate nodes, an average geographical distance from each of the other nodes of the set of candidate nodes and selecting a node having a highest average geographical distance in the set of candidate nodes as the particular node;

selecting a next node of the plurality of nodes based on the cost value of the next node; and replacing the particular node in the set of candidate nodes with the next node; and after assigning a set of job nodes to the map reduce job, performing the map reduce job by at least disturbing chunks of input data to each node of the assigned set of job nodes, wherein each node of the assigned set of job nodes is configured to:

perform map processing on a respective chunk of the input data to generate mapped data;

transfer the mapped data to other nodes of the assigned set of job nodes, wherein the transfer is based on keys that are output by a map function; and perform reduce processing on a respective chunk of the mapped data.

9. The computer program product of claim 8, wherein the description of the map reduce job comprises a target number of nodes, and wherein the set of candidate nodes comprises a number of nodes that is equal to the target number of nodes.

10. The computer program product of claim 8, further comprising maintaining a respective node profile for each of the plurality of nodes of the map reduce network, wherein the node profile for each node comprises: the cost value of the node, the cost value comprising a cost per unit time for using the node, an availability of the node, the geographical location of the node, and a service class of the node;

monitoring the plurality of nodes of the map reduce network during operation of the map reduce network; and updating the node profiles based on the monitoring.

11. The computer program product of claim 10, further comprising filtering the plurality of nodes of the map reduce network based on service class and availability to determine a filtered list of nodes that are appropriate for performing the map reduce job; and sorting the filtered node list based on cost value from cheapest to most expensive, wherein the set of candidate nodes is selected from the sorted list.

12. The computer program product of claim 11, wherein selecting the set of candidate nodes from the plurality of nodes comprises selecting a set of cheapest nodes from the sorted list; and wherein the next node comprises a next cheapest node in the sorted list.

13. A computer system for a distributed map reduce network, the system comprising:

a memory; and a processor, communicatively coupled to said memory, the computer system configured to perform a method comprising:

receiving a description of a map reduce job comprising a time deadline;

assigning a set of job nodes to the map reduce job from a plurality of nodes of the distributed map reduce network, wherein each of the plurality of nodes has an associated respective cost value and geographical location, and wherein assigning the set of job nodes comprises:

selecting a set of candidate nodes from the plurality of nodes, wherein the set of candidate nodes are selected based on cost value;

determining an amount of time required to perform the map reduce job by the set of candidate nodes;

comparing the determined amount of time to the time deadline; and based on the determined amount of time not meeting the time deadline:

selecting a particular node of the set of candidate nodes for replacement based on the geographical location of the particular node, wherein selecting the particular node of the set of candidate nodes for replacement based on the geographical location of the particular node comprises determining, for each node of the set of candidate nodes, an average geographical distance from each of the other nodes of the set of candidate nodes and selecting a node having a highest average geographical distance in the set of candidate nodes as the particular node;

selecting a next node of the plurality of nodes based on the cost value of the next node; and replacing the particular node in the set of candidate nodes with the next node; and after assigning a set of job nodes to the map reduce job, performing the map reduce job by at least disturbing chunks of input data to each node of the assigned set of job nodes, wherein each node of the assigned set of job nodes is configured to:

perform map processing on a respective chunk of the input data to generate mapped data:

transfer the mapped data to other nodes of the assigned set of job nodes, wherein the transfer is based on keys that are output by a map function; and perform reduce processing on a respective chunk of the mapped data.

14. The system of claim 13, wherein the description of the map reduce job comprises a target number of nodes, and wherein the set of candidate nodes comprises a number of nodes that is equal to the target number of nodes.

15. The system of claim 13, further comprising maintaining a respective node profile for each of the plurality of nodes of the map reduce network, wherein the node profile for each node comprises: the cost value of the node, the cost value comprising a cost per unit time for using the node, an availability of the node, the geographical location of the node, and a service class of the node;

monitoring the plurality of nodes of the map reduce network during operation of the map reduce network; and updating the node profiles based on the monitoring.

16. The system of claim 15, further comprising filtering the plurality of nodes of the map reduce network based on service class and availability to determine a filtered list of nodes that are appropriate for performing the map reduce job; and sorting the filtered node list based on cost value from cheapest to most expensive, wherein the set of candidate nodes is selected from the sorted list.

* * * * *